(12) United States Patent
Yaoita

(10) Patent No.: US 7,503,426 B2
(45) Date of Patent: Mar. 17, 2009

(54) REFLECTING PLATE TYPE SILENCER PIPE

(75) Inventor: Akira Yaoita, Tokyo (JP)

(73) Assignees: MK Seiko Co., Ltd., Chikuma-shi (JP); Viva Co., Ltd., Tokyo (JP)

( * ) Notice: Subject to any disclaimer, the term of this patent is extended or adjusted under 35 U.S.C. 154(b) by 242 days.

(21) Appl. No.: 11/504,546

(22) Filed: Aug. 14, 2006

(65) Prior Publication Data

US 2007/0034444 A1    Feb. 15, 2007

(30) Foreign Application Priority Data

Aug. 15, 2005    (JP) .............................. 2005-261289

(51) Int. Cl.
*E04F 17/04*    (2006.01)
*F01N 1/06*    (2006.01)
*F01N 1/00*    (2006.01)

(52) U.S. Cl. .................... 181/224; 181/253; 181/281

(58) Field of Classification Search ................ 181/224, 181/206, 225, 226, 227, 228, 253, 250, 281, 181/276, 258
See application file for complete search history.

(56) References Cited

U.S. PATENT DOCUMENTS

| | | | | |
|---|---|---|---|---|
| 3,568,791 A | * | 3/1971 | Luxton | 181/224 |
| 3,700,069 A | * | 10/1972 | Rausch et al. | 181/227 |
| 3,779,341 A | * | 12/1973 | Huggins | 181/225 |
| 3,948,348 A | * | 4/1976 | Bychinsky | 181/206 |
| 3,948,349 A | * | 4/1976 | Bychinsky | 181/206 |
| 4,359,134 A | * | 11/1982 | Jackson | 181/230 |
| 4,660,676 A | * | 4/1987 | Eustace | 181/224 |
| 5,033,581 A | * | 7/1991 | Feuling | 181/257 |
| 5,088,575 A | * | 2/1992 | Eriksson | 181/206 |
| 5,121,811 A | * | 6/1992 | Shima et al. | 181/201 |
| 5,168,130 A | * | 12/1992 | Shima et al. | 181/206 |
| 6,633,646 B1 | * | 10/2003 | Hwang | 381/71.5 |
| 6,796,859 B1 | * | 9/2004 | Justen et al. | 440/88 A |
| 2005/0279569 A1 | * | 12/2005 | Harris | 181/250 |
| 2007/0125593 A1 | * | 6/2007 | Hashizume | 181/225 |

FOREIGN PATENT DOCUMENTS

| | | | | |
|---|---|---|---|---|
| JP | 52044323 A | * | 4/1977 | |
| JP | 01041609 A | * | 2/1989 | |
| JP | 2002-022254 | | 1/2002 | |
| JP | 2002070799 A | * | 3/2002 | |
| JP | 2005-031599 | | 2/2005 | |

* cited by examiner

*Primary Examiner*—Edgardo San Martin
(74) *Attorney, Agent, or Firm*—Christensen O'Connor Johnson Kindness PLLC

(57) ABSTRACT

A reflecting plate type silencer pipe including a reflecting plate is provided for reducing a dominant frequency noise passing through a pipeline. Sound waves propagated in the pipeline as a one-dimensional plane wave are divided into two, that is, sound waves advancing straight along the pipeline and sound waves caused to pass through a bypass route by the reflecting plate thereby being delayed in phase. Both of the sound waves are joined again so as to synchronously advance in the same direction and in parallel to each other with the sound waves being the same in amplitude and opposite in phase to each other, and wave interference is effected between the sound waves, whereby wave propagation energy of the sound wave of the frequency to be silenced passing through the pipeline is selectively dissipated.

2 Claims, 5 Drawing Sheets

REFLECTING PLATE TYPE SILENCER PIPE

FIELD OF THE INVENTION

The present invention relates to a reflecting plate type silencer pipe in which a sound wave reflecting plate is provided on an inner side or an outer side of a pipe through which a fluid such as gas or liquid is passed, for selectively reducing sound wave energy of a specific frequency passing through a pipeline while securing a flow passage for the fluid.

BACKGROUND

A fluid, for example, a gas such as air may involve a problem in terms of noise. In particular, noise emitted from an axial blower, a gas turbine engine, etc. and noise leaking from an airflow passage of an apparatus requiring circulation of air for ventilation or waste heat, a soundproof chamber, or the like may be loud enough to constitute a problem. Such problem of noise is generally coped with, for example, by surrounding a noise generation source with a noise-proof cover, connecting a muffler to an air intake/exhaust port, or providing a sound absorbing material in the airflow passage. In the case as discussed here, however, a single pipeline serves as both the airflow passage and a noise propagation passage, and it is often rather difficult to prevent solely passage of the noise by a definite and effective means without causing any pressure loss in the airflow passage. In particular, to achieve a reduction in noise of low frequency, it is necessary to increase a thickness, volume of the sound absorbing material, or overall size of a structure of a silencer, so it is not easy to cope with the noise problem while taking into account the conveniences for practical use, such as compactness, lightness, and durability (see, for example, JP 2002-22254 A and JP 2005-31599 A).

The noise emitted from the axial blower, the gas turbine, etc. is generated as a dominant frequency sound of high sound pressure level, in which a sound of a frequency expressed by a product of the number of moving vanes of a fan and an RPM is acutely conspicuous. Such dominant frequency sound often has a much higher noise level than a level of noise generated from an airflow itself passing through the pipeline at high speed to constitute a predominant noise portion.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

It is an object of the present invention to provide a reflecting plate type silencer pipe which, in a case where a single pipeline serves as both a flow passage for a fluid and a passage for noise, helps to form the pipeline to allow proper selective use of physically different characteristics of a movement of a fluid and a propagation of a sound wave to thereby functionally utilize these characteristics, such that it is possible to selectively reduce solely noise of a dominant frequency passing through the pipeline while securing a function to allow the fluid to pass through the pipeline.

In a pipeline in which propagation characteristics of a sound wave of a frequency to be silenced, out of sound waves being propagated through the pipeline using a fluid as a medium, can be treated as those of a plane wave advancing one-dimensionally, sound waves propagated straight through the pipeline are divided into a first sound wave group and a second sound wave group. A rectilinear propagation passage is provided through which the sound wave of the first sound wave group advances straight without being interrupted, and a first reflecting plate is provided for interrupting the sound wave of the second sound wave group propagated straight and reflecting the sound wave of the second sound wave group in a different advancing direction. A second reflecting plate is provided for reflecting the sound wave of the second sound wave group reflected by the first reflecting plate and changed in its advancing direction in the same direction as the sound wave of the first sound wave group advancing straight through the rectilinear propagation passage. The first and second reflecting plates form a bypass passage for sound wave propagation. Due to a difference in propagation route between the first sound wave group and the second sound wave group, synchronization is effected in opposite phases between the sound wave of the first sound wave group propagated straight through the rectilinear propagation passage and the sound wave of the second sound wave group advancing through the bypass passage with its sound wave propagation distance being increased by an amount corresponding to ½ of a wavelength of the frequency to be silenced and delayed in phase by 180° by the first reflecting plate and the second reflecting plate. Thus, wave interference is effected with the sound waves of both the first sound wave group and the second sound wave group being propagated in the same direction as in the state prior to division to thereby selectively dissipate the wave propagation energy of the sound wave of the frequency to be silenced passing through the pipeline.

In another aspect of the present invention, in a pipeline in which propagation characteristics of a sound wave of a frequency to be silenced, out of sound waves being propagated through the pipeline using a fluid as a medium, can be treated as those of a plane wave advancing one-dimensionally, sound waves are divided into a first sound wave group propagated from a terminal opening plane of the pipeline straight in an axial direction of the pipeline in a plane-wave-like fashion and a second sound wave group diffracted and radiated, using an edge of a terminal end of the pipeline as a new generation source of a diffracted sound, to an outer periphery of a sound wave propagation area for the first sound wave group. A rectilinear propagation passage is provided through which the sound wave of the first sound wave group advances straight in a cylindrical fashion from the terminal opening plane of the pipeline. A third reflecting plate is provided, surrounding an edge portion of the terminal end of the pipeline from the outside so that the third reflecting plate covers the edge portion of the terminal end of the pipeline. The third reflecting plate forms a bypass passage for sound wave propagation, and changes an advancing direction of the sound wave of the second sound wave group such that the sound wave of the second sound wave group is diffracted and is propagated in a direction that is the same or approximately the same as the advancing direction of the sound wave of the first sound wave group advancing straight in a cylindrical fashion from the terminal opening surface of the pipeline. Due to the difference in propagation route between the first sound wave group and the second sound wave group, synchronization is effected in opposite phases between the sound wave of the first sound wave group propagated straight through the rectilinear propagation passage and the sound wave of the second sound wave group advancing through the bypass passage with its sound wave propagation distance being increased by an amount corresponding to ½ of a wavelength of the frequency to be silenced and delayed in phase by 180° by the third reflecting plate. Thus, wave interference is effected, with the sounds of both the first sound wave group and the second sound wave group being propagated in the same direction to thereby selectively dissipate the wave propagation energy of the sound wave of the frequency to be silenced passing through the pipeline.

In yet another aspect of the present invention, a movable reflection mechanism is provided in a vicinity of one of the first reflecting plate, the second reflecting plate, and the third reflecting plate, to make it possible to vary the distance by which the sound wave of the second sound wave group propagates is extended through the bypass passage with respect to the propagation distance of the sound wave of the first sound wave group.

In the technical idea of a reflecting plate type silencer pipe according to the present invention, attention is paid to the fact that there is a difference in physical behavior between the movement of a fluid and the propagation of a sound, which is conveyed through rectilinear propagation using the fluid as a medium. The fluid may be any one of water, air, exhaust gas, etc. As can be seen from the fact that there is a difference between the moving speed of a fluid and the propagation speed of a sound propagated by using the same fluid as a medium, the movement of the fluid in the pipeline is a mass movement caused by a fluid flow due to a difference in pressure from a high pressure side to a low pressure side, whereas the propagation of the sound wave is a wave propagation in which directivity is imparted to vibration of fluid particles constituting the sound propagation medium. Thus, by effectively utilizing the respective physical functions of the two, the reflecting plate type silencer pipe is formed.

Here, reduction of the propagation energy due to the interference of the sound wave will be discussed. Ideal silencing owing to sound wave interference is based on a principle of wave absorption in which wave fronts of a primary sound wave and a secondary sound wave which are the same in amplitude and opposite in phase to each other overlap with each other to be propagated in the same direction so that both the sound waves cancel each other out due to an interferential action. The most basic way of silencing owing to the sound wave interference using the principle described above is that, when the secondary sound wave, which is the same in amplitude and opposite in phase to a primary generated sound, is generated in a point of the same position as a primary point sound source, the primary sound wave and the secondary sound wave cancel each other out, thereby completely eliminating the energy of the wave diffused and propagated.

The sound waves emitted at substantially the same time from the same sound sources and propagated in the pipeline as one-dimensional plane waves are divided into two, that is, sound waves advancing straight along the pipeline and sound waves caused to pass through a bypass route by the reflecting plate thereby being delayed in phase, which are called first sound waves and second sound waves, respectively. When both the sound waves are joined again so as to synchronously advance in the same direction and in parallel to each other with the sound waves being the same in amplitude and opposite in phase to each other, the inside of the pipeline becomes equivalent to a case where the infinite numbers of interferential action points are provided between the first sound waves and the second sound waves. Therefore, the principle of the wave absorption of the sound wave propagation energy is achieved. The energy eliminated once never appears again.

The reflecting plate type silencer pipe according to the present invention follows the principle of the wave absorption of the sound wave propagation energy described above. In the reflecting plate type silencer pipe, it is only necessary to provide a reflection mechanism inside or outside the pipeline.

In particular, regardless of a magnitude of the sound pressure level, the reflecting plate type silencer pipe can treat without any problem even a noise of an excessive sound pressure level, such as a sound of a long wavelength and of a low frequency band. It involves no aggravation of deterioration in function due to pressure loss in the fluid passing through the pipe, thereby making it possible, with a simple structure, to selectively and efficiently reduce solely a noise of a specific frequency passing through the pipeline.

Further, the reflecting plate type silencer pipe, in which a reflecting plate is provided in the outer periphery and in the vicinity of the pipeline terminal edge, may be a cylindrical pipeline with no bending, does not easily involve pressure loss, is simple and compact, and uses no porous sound absorbing material such as glass wool, so that there is no fear of deterioration in function due to clogging caused by dust, oil dust, exhaust gas, waste heat, etc., thereby facilitating maintenance and achieving a reduction in cost.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
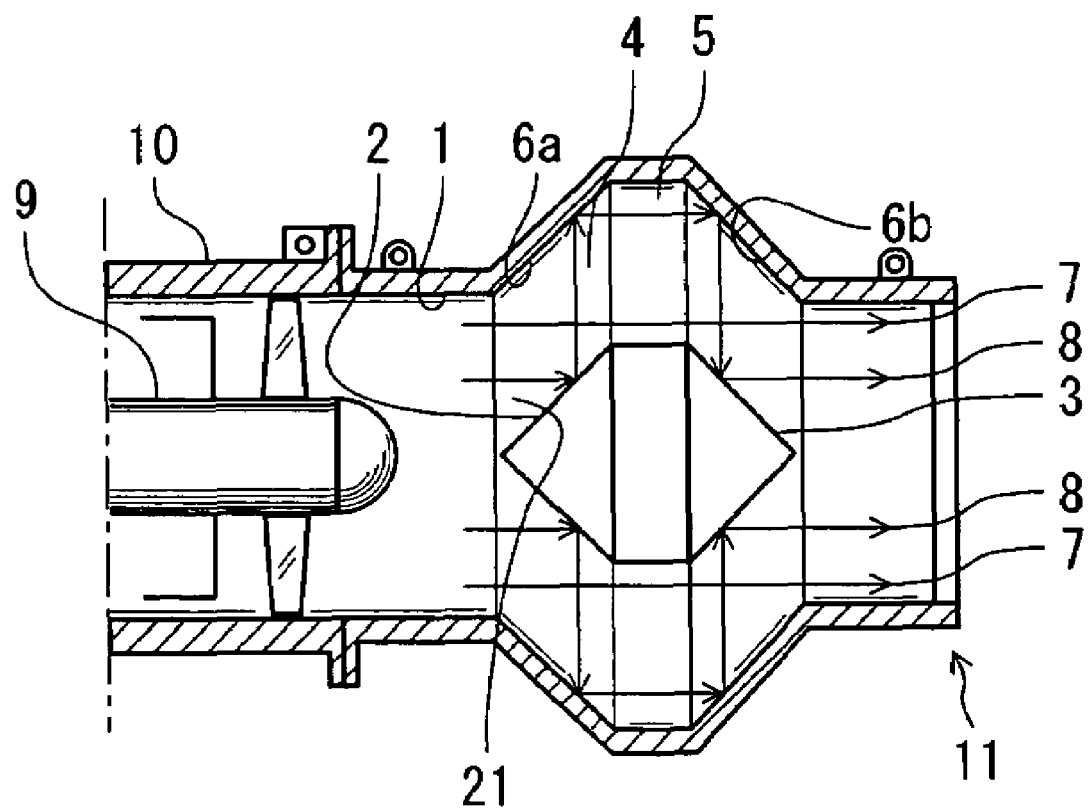
FIG. 1 is a sectional view showing a construction and an operation of Embodiment 1 according to the present invention.

In the following, preferred embodiments of the present invention will be described in detail with reference to the drawings.

In the drawings, the same components are indicated by the same reference numerals/symbols, and a redundant description thereof will be omitted.

Embodiment 1

Figure 2:
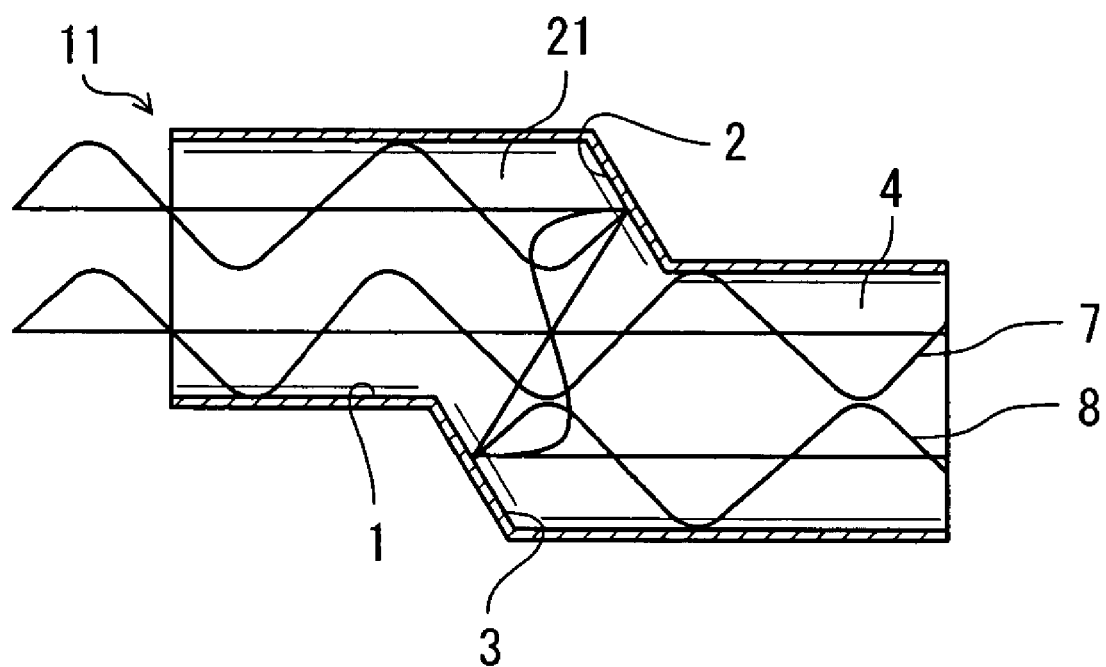
FIG. 2 is a diagram showing a basic principle according to the present invention.
Figure 3:
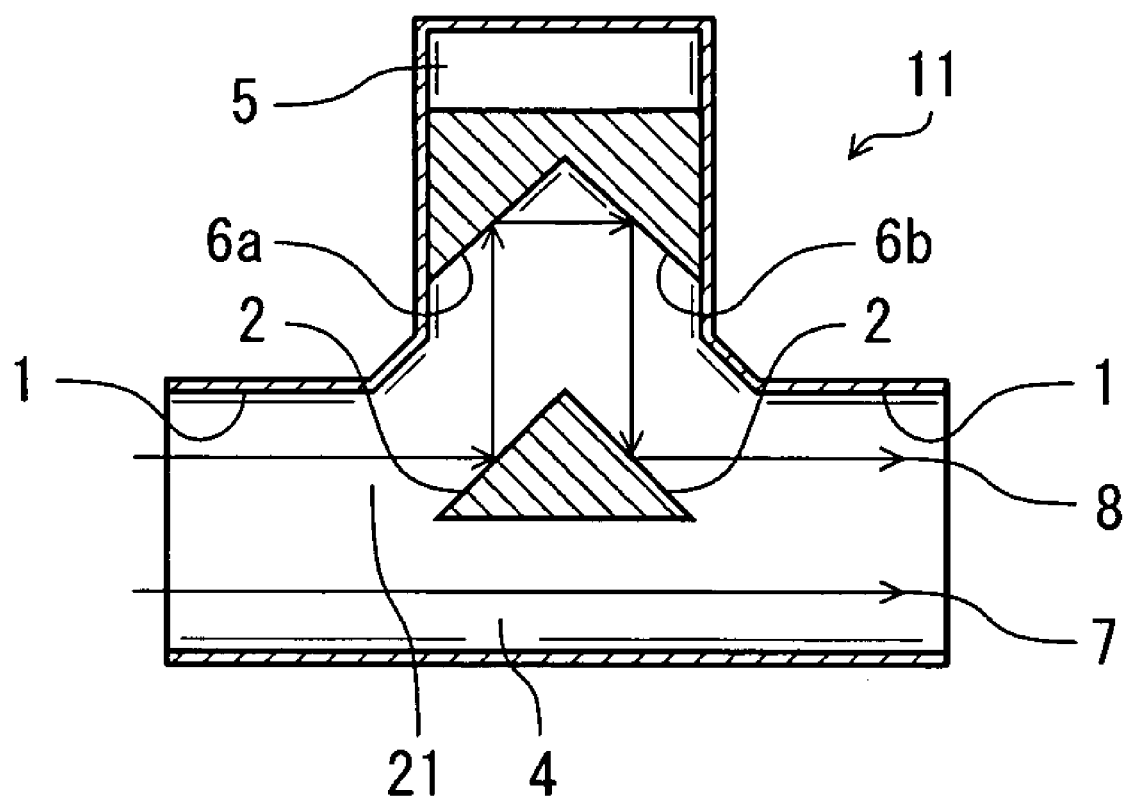
FIG. 3 is a diagram illustrating an operational principle of a movable reflecting plate according to the present invention.

A reflecting plate type silencer pipe according to an embodiment of the present invention will be described with reference to FIGS. 1, 2, and 3. FIG. 1 is a sectional view showing a construction and an operation of the reflecting plate type silencer pipe of Embodiment 1 according to the present invention, FIG. 2 is a diagram showing a basic principle of the same, and FIG. 3 is a diagram illustrating an operational principle of a movable reflecting plate. In Embodiment 1, the present invention is applied to an axial blower, and a fluid to which the present invention is applied is air.

In FIGS. 1, 2, and 3, there are provided a pipeline 1, a first reflecting plate 2, a second reflecting plate 3, a rectilinear propagation passage 4, a reflection mechanism chamber 5, a first reflection surface 6a, a second reflection surface 6b, a rectilinear propagation sound 7, an antiphase sound 8, an axial blower 9, a casing 10, a reflecting type silencer pipe 11, and a bypass passage 21.

In FIG. 1, at a center of a central axis of the cylindrical pipeline 1, there is installed the first reflecting plate 2 having a conical forward end directed in a direction of incidence of noise, and the second reflecting plate 3 is installed back-to-back with the first reflecting plate 2 having a conical forward end directed in an advancing direction of the noise passing through the pipeline 1. The first reflecting plate 2 and the second reflecting plate 3 are each formed of a material of high sound reflectance. Around the first reflecting plate 2 and the second reflecting plate 3, which are arranged back-to-back with respect to each other, there is provided the reflection mechanism chamber 5 through an intermediation of a space maintaining a predetermined interval for the rectilinear propagation passage 4. Both side surfaces of the reflection mechanism chamber 5 are formed by the first reflection surface 6a and the second reflection surface 6b. The reflecting plate type silencer pipe 11, which is formed by the pipeline 1, the first reflecting plate 2, the second reflecting plate 3, the rectilinear propagation passage 4, the bypass passage 21, and the reflection mechanism chamber 5, is joined to the casing 10 of the axial blower 9.

In the following, the operation of this embodiment will be described with reference to FIGS. 1, 2, and 3.

FIG. 1 shows an example in which the present invention is applied to the axial blower 9. A sound wave of a dominant frequency of noise radiated from the axial blower 9 and passing through the pipeline 1 in a plane-wave-like fashion is divided into a first group and a second group. The sound wave of the first group advances straight through the rectilinear propagation passage 4 together with the fluid passing through the pipeline 1, and the sound wave of the second group is reflected by the first reflecting plate 2 provided in the pipeline 1, and advances toward the first reflection surface 6a provided on a side surface of the reflection mechanism chamber 5. The sound wave incident on the first reflection surface 6a is reflected to advance to the second reflection surface 6b, and the sound wave incident on the second reflection surface 6b is reflected to the second reflecting plate 3. The sound wave incident on the second reflecting plate 3 is reflected in the same direction as an advancing direction of the sound wave advancing straight through the rectilinear propagation passage 4. A propagation distance of the sound wave of the second group advancing through the bypass passage 21 is extended by a difference corresponding to ½ of a wavelength of a frequency to be controlled, and the sound wave of the second group attains a propagation state which is of an opposite phase with respect to the sound wave of the first group advancing straight through the rectilinear propagation passage 4. Wave interference is effected in such timing that both sound waves are in the same propagating direction and of opposite phases, whereby the propagation energy of the dominant frequency noise passing through the pipeline 1 is dissipated.

FIG. 2 is a diagram illustrating the basic operational principle of the reflecting plate type silencer pipe of the present invention, in which the pipeline 1 exhibits a rectangular sectional configuration. The sound wave of the first group, which advances straight through the rectilinear propagation passage 4, and the sound wave of the second group, which is reflected by the first reflecting plate 2 and the second reflecting plate 3 to increase its propagation distance and advances through the bypass passage 21, join each other again at a position, where wave interference is effected such that the sound waves advancing through their respective routes are propagated in the same direction and are of opposite phases, whereby the propagation energy of the noise of the frequency to be silenced passing through the pipeline 1 is dissipated. The two sound waves advancing through the two divided routes join each other again, with vibration characteristics being imparted to fluid particles such that they exhibit the same directivity and that vector amounts of their common periodic motion are of opposite phases, and the respective kinetic vector amounts of waves of both sound waves interfere with each other in a state where they are balanced in polarity. At this time, the wave energy of the sound wave of the frequency to be silenced passing through the pipeline 1 is reduced instantaneously and drastically.

To efficiently reduce the noise radiated by the axial blower 9, it is effective to specify a dominant frequency sound whose sound pressure level is maximum and which is predominant as a frequency sound to be controlled, and to reduce it selectively. Generally speaking, the dominant frequency sound is a sound whose sound pressure level is markedly conspicuous and which has low frequency. All the specifications in terms of design of the reflecting plate type silencer pipe, that is, a configuration of the pipeline, positions of the reflecting plates, distance and angle between the reflecting plates, etc., are set depending upon a magnitude of wavelength of the dominant frequency sound. FIG. 3 is a diagram showing the operating principle of the movable reflecting plate of a slide type structure in which the first reflection surface 6a and the second reflection surface 6b in the reflection mechanism chamber 5 can integrally make a parallel movement and in which the bypass propagation distance through which the sound wave of the second group is propagated can be varied in correspondence with the wavelength of the frequency to be controlled.

Regarding the movement of the passing fluid, it is necessary to reduce as much as possible the pressure loss generated when a fluid substance having mass and viscosity moves through the pipeline 1. While a flow line due to the flow of the fluid is somewhat bent in the vicinity of the first reflecting plate 2 and the second reflecting plate 3, the pipeline obtained as a whole, inclusive of the rectilinear propagation passage 4, is one exhibiting no great change in the sectional area of the flow passage for the fluid passing therethrough, thereby minimizing a deterioration in function due to the pressure loss.

Embodiment 2

Embodiment 2 will be described with reference to FIGS. 4 and 5.

Figure 4:
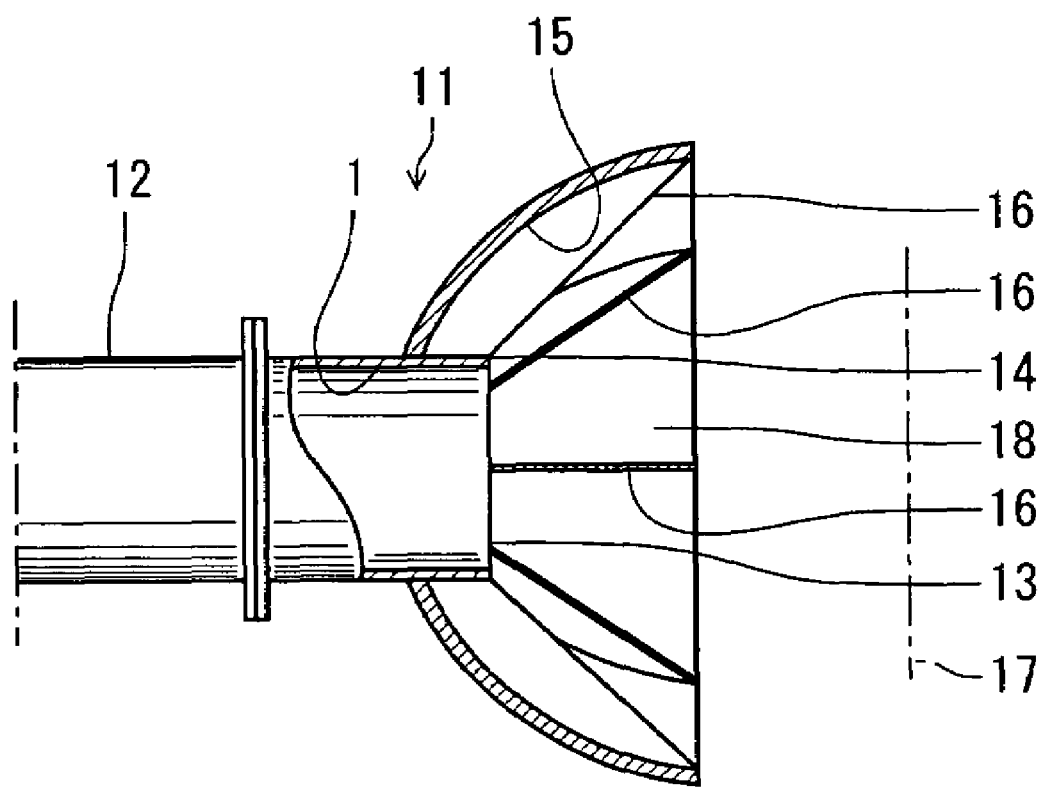
FIG. 4 is a sectional view showing a construction and an operation of Embodiment 2 according to the present invention.
Figure 5:
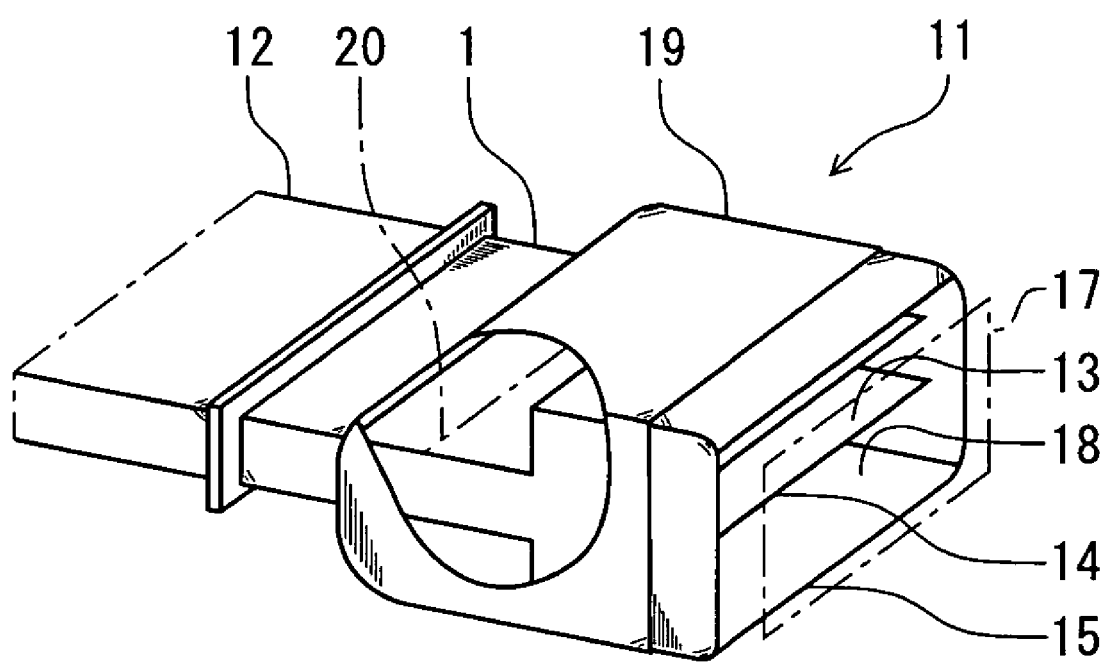
FIG. 5 is a perspective view of a silencer pipe having a slide type reflecting plate mechanism according to the present invention.

FIG. 4 is a sectional view showing a construction and an operation of Embodiment 2, and FIG. 5 is a perspective view of a silencer pipe with a slide type reflecting plate mechanism. In Embodiment 2, the present invention is applied to an exhaust pipe of a gas turbine engine. The portions that are the same as those of FIGS. 1, 2, and 3 are indicated by the same reference numerals/symbols.

There are provided an exhaust pipe 12, a terminal opening plane 13, a terminal edge 14, a third reflecting plate 15, a partition 16, an interference plane 17, an opening plane 18, a reflecting plate cover 19, and a second focus 20.

In FIGS. 4 and 5, there is formed a reflecting plate type silencer pipe 11 in which a space between the pipeline 1 and the third reflecting plate 15 surrounding the terminal edge 14 of the pipeline 1 from outside serves as the bypass passage 21 for extending the distance through which sound wave is to be propagated, with the reflecting plate type silencer pipe 11 being connected to the exhaust pipe 12 of the gas turbine engine. The interference plane 17 is at a position where wave fronts of both of the sound waves radiated from the terminal opening plane 13 and the opening plane 18 join each other.

In the following, the operation of this embodiment will be described with reference to FIG. 4.

In the example shown in FIG. 4, the present invention is applied to the exhaust pipe 12 of the gas turbine engine. Of the dominant frequency noise sound waves passing through the exhaust pipe 12 in the form of plane waves, the sound wave radiated from the terminal opening plane 13 of the pipeline 1 and propagated straight in a substantially cylindrical fashion is referred to as the first group, and the sound wave diffracted at the terminal edge 14 of the pipeline 1 and diffused to the outer periphery is referred to as the second group. Here, the third reflecting plate 15 is a surface formed by rotating, about an axis of the pipeline 1, a quadratic curve which is formed in a plane including the central axis of the pipeline 1 and whose focus is a point on the terminal edge 14. The diffracted sound radiated and diffused using the terminal edge 14 as a new sound source is radiated as a reflection sound to which directivity in a predetermined direction is imparted by the third reflecting plate 15. As compared with a sound wave propagation distance between the terminal opening plane 13 and the interference plane 17, the sound propagation distance through which the sound wave from the terminal edge 14 serving as the new sound source of the diffracted sound is reflected by the third reflecting plate 15 and reaches the interference plane 17 is extended by a distance corresponding to ½ wavelength of the frequency to be controlled. The propagation state of the sound wave of the second group is made opposite in phase with respect to the sound wave of the first group, and wave interference is effected in synchronized timing at various positions of the interference plane 17 between the sound wave of the first group radiated from the terminal opening plane 13 and advancing in a substantially cylindrical fashion and the sound wave of the second group that is approximately the same as the sound wave of the first group in sound wave propagating direction and of opposite phase thereto, whereby the propagation energy of both sound waves is reduced instantaneously and drastically.

The partition 16 is a sound wave partition dividing, at equal intervals, the space between an outer wall of the cylindrical pipeline 1 and the third reflecting plate 15. The partition 16 serves as a wave guide plate for suppressing, within a fixed range, disturbance in the propagation route of the sound wave separated by the partition 16, diffracted at each point on the ridge of the terminal edge 14 and reflected by the third reflecting plate 15 before reaching the interference plane 17, effecting control so as to prevent aggravation of a deterioration in interference efficiency generated by an error in the propagation distance of the sound wave of the second group.

FIG. 5 shows an example of the bypass passage 21 in which a distance for the propagation of the sound wave of the second group can be varied. The pipeline 1 has a rectangular cross-sectional configuration. The terminal edge 14 is provided to extend in a longitudinal direction of the slit-like terminal opening plane 13 on the upper and lower sides thereof. The third reflecting plate 15 is formed on an outer side of the terminal edge 14 by curving a flat plate into an elliptical surface whose first focus is the terminal edge 14, and the elliptical reflecting plate cover 19, which uses as its focus the second focus 20 set on the outer wall of the pipeline 1, is slidably fitted onto the third reflecting plate 15. The slit-like opening between the outer wall of the pipeline 1 and the third reflecting plate 15 serves as the opening plane 18, and a cavity surrounded by the outer wall of the pipeline 1, the third reflecting plate 15, and the reflecting plate cover 19 constitutes the bypass passage 21 which allows extension and contraction of the sound wave propagation distance.

The sound wave diffracted at the terminal edge 14 as the new sound source and introduced from the opening plane 18 is reflected by the third reflecting plate 15, and heads toward the second focus 20 in the vicinity of a bottom portion of the reflecting plate cover 19. The sound wave incident on the second focus 20 is reflected again at the second focus 20 portion, and is further reflected by the reflecting plate cover 19 to head toward the first focus, that is, in the direction toward the terminal edge 14 before being radiated outwards from the opening plane 18. Wave interference is effected at the interference plane 17 synchronously between the sound wave of the first group radiated from the slit-like terminal opening plane 13 and the sound wave of the second group which is in the same propagating direction and of opposite phase with respect to the sound wave of the first group and radiated from the opening plane 18, whereby the propagation energy of the dominant frequency noise radiated from the terminal opening plane 13 is dissipated.

A position of the second focus 20 moves in correspondence with a position of the slide type reflecting plate cover 19, so it is possible to adjust, in correspondence with the wavelength of the frequency to be controlled, the propagation distance of the sound wave of a bypass route extending from the terminal edge 14, constituting a new sound source of the diffracted sound of the sound wave of the second group, to the interference plane 17.

To efficiently reduce the noise radiated from the exhaust pipe 12 of the gas turbine engine, it is effective to specify, as the frequency sound to be controlled, a dominant frequency sound which has the maximum sound pressure level and is predominant, and to selectively remove the same. Generally speaking, the dominant frequency sound is a sound of a frequency with markedly conspicuous sound pressure level, and all the specifications in terms of design of the reflecting plate type silencer pipe, that is, the configurations of the pipeline and the reflecting plate, the position of the focus, etc. are set depending on the magnitude of the wavelength of the dominant frequency sound.

When the pipeline 1 has a large diameter, a plurality of sets of reflecting plate type silencer pipes 11 are arranged in an appropriate combination, and a deterioration in function due to pressure loss or the like is mitigated while maintaining the flow rate and flow velocity of the fluid within a fixed range by preventing conspicuous bending of the fluid flow line.

In the above-mentioned embodiments, the present invention is applied to the axial blower, the exhaust pipe of the gas turbine engine, etc. The present invention helps to efficiently reduce noise caused by flow of a fluid and noise propagated and passing through a flow passage and using the fluid as a medium, in particular, a dominant frequency noise of a large output generated by a motor or the like having a rotary element. The reflecting plate type silencer pipe of the present invention has a simple structure, is compact, and allows a reduction in weight, and when applied, for example, to a muffler of an automobile, it is possible to reduce the noise passing through the flow passage for the exhaust gas without involving any great pressure loss in the flow passage, so it is possible to substantially shorten the pipeline of the exhaust pipe, making it possible to save energy that is wasted through pressure loss. Apart from this, the present invention proves effective for uses where ventilation is required while there is a demand to cut off noise, for example, in coping with noise generated when taking in and discharging compressed air, thus the present invention can be applied to a variety of industrial uses.

Further, it goes without saying that the present invention is also applicable to cases in which the fluid is not a gas but a liquid, such as water or seawater. In such cases also, the present invention provides the same effects as those of the above-mentioned embodiments.

While illustrative embodiments have been illustrated and described, it will be appreciated that various changes can be made therein without departing from the spirit and scope of the invention.

The embodiments of the invention in which an exclusive property or privilege is claimed are defined as follows:

1. A reflecting plate type silencer pipe, comprising:
   a pipeline in which propagation characteristics of a sound wave of a frequency to be silenced, out of sound waves being propagated through the pipeline using a fluid as a medium, can be treated as those of a plane wave advancing one-dimensionally, and in which sound waves propagated straight through the pipeline are divided into a first sound wave group and a second sound wave group;
   a rectilinear propagation passage through which the sound wave of the first sound wave group advances straight without being interrupted;
   a first reflecting plate for interrupting the sound wave of the second sound wave group propagated straight and reflecting the sound wave in a different advancing direction such that the reflected second sound wave group crosses over the first sound wave group;
   a second reflecting plate for reflecting the sound wave of the second sound wave group, which was reflected by the first reflecting plate and changed in its advancing direction to cross over the first sound wave group, in the same direction as the sound wave of the first sound wave group advancing straight through the rectilinear propagation passage; and
   a bypass passage for sound wave propagation being formed by the first reflecting plate and the second reflecting plate in the pipeline;
   wherein, due to a difference in propagation route between the first sound wave group and the second sound wave group, synchronization is effected in opposite phases between the sound wave of the first sound wave group propagated straight through the rectilinear propagation passage and the sound wave of the second sound wave group advancing through the bypass passage with its sound wave propagation distance being increased by an amount corresponding to ½ of a wavelength of the frequency to be silenced and delayed in phase by 180° by the first reflecting plate and the second reflecting plate, and wave interference is effected with the sound waves of both the first sound wave group and the second sound wave group being propagated in the same direction as in the state prior to division to thereby selectively dissipate the wave propagation energy of the sound wave of the frequency to be silenced passing through the pipeline.

2. The reflecting plate type silencer pipe according to claim 1, further comprising a movable reflection mechanism provided in a vicinity of one of the first reflecting plate and the second reflecting plate, the movable reflection mechanism being provided to make it possible to vary the distance by which the sound wave of the second sound wave group propagates is extended through the bypass passage with respect to the propagation distance of the sound wave of the first sound wave group.

* * * * *